United States Patent [19]
Bishop et al.

[11] Patent Number: 5,436,795
[45] Date of Patent: Jul. 25, 1995

[54] PRESSURE TRANSDUCER APPARATUS AND METHOD FOR MAKING SAME

[75] Inventors: Robert P. Bishop, Pembroke; Paul L. Hainey, Douglas, both of Mass.

[73] Assignee: Texas Instruments Incorporated, Dallas, Tex.

[21] Appl. No.: 218,785

[22] Filed: Mar. 28, 1994

[51] Int. Cl.$^6$ .................. H01G 7/00; H01G 5/011; G01L 9/12
[52] U.S. Cl. .................. 361/283.4; 361/278; 73/724
[58] Field of Search .................. 73/718, 724, 715; 361/278, 280, 283.1, 283.3, 283.4, 306.1, 307; 174/267; 338/42

[56] References Cited

U.S. PATENT DOCUMENTS

| | | |
|---|---|---|
| 4,207,604 | 6/1980 | Bell . |
| 4,345,299 | 8/1982 | Ho .................. 73/724 |
| 4,716,492 | 12/1987 | Charboneau et al. . |
| 4,773,972 | 9/1988 | Mikkor .................. 73/718 |
| 4,894,635 | 1/1990 | Yajima et al. . |
| 4,972,717 | 11/1990 | Southworth et al. . |
| 4,991,283 | 2/1991 | Johnson et al. . |
| 5,043,841 | 8/1991 | Bishop et al. . |

FOREIGN PATENT DOCUMENTS

| | | | |
|---|---|---|---|
| 1675703 | 9/1991 | U.S.S.R. .................. | 73/718 |
| 9115742 | 10/1991 | WIPO .................. | 73/718 |

OTHER PUBLICATIONS

Copending application Ser. No.: 07/972,680, Filed on Nov. 6, 1992, Pressure Transducer Apparatus, V. Shukla et al.

*Primary Examiner*—Bruce A. Reynolds
*Assistant Examiner*—Gregory L. Mills
*Attorney, Agent, or Firm*—Russell E. Baumann; Richard L. Donaldson; Rene' E. Grossman

[57] ABSTRACT

A monolithic capacitive pressure transducer (12, 12') is made by separately forming under pressure a diaphragm (22, 22') and a base (24, 24') having a recess (14) in the top surface using ceramic powder coated with an organic binder. Metal layers are deposited on the two pieces and the pieces are then joined together to form a single unit. A spacer (36) may be inserted in the recess to ensure that a predetermined gap is maintained between the two parts during the joining operation. The parts are then heated to allow the binder organics, as well as the spacer organics if a spacer is employed, to be vaporized and/or decomposed and removed through the open pores of the diaphragm and base and then sintered to change the parts into a monolithic body and to convert the metallized layer into a conductive layer bonded to the ceramic. In one embodiment the metal layers include terminal pads (18b, 19c, 20c) formed on the diaphragm and joinder pads (19b, 20b) formed on the base around terminal receiving bores (34, 32) each in alignment with a terminal pad. In a second embodiment terminal pads (18b', 19d', 20d') are formed on the diaphragm with vias extending radially inwardly from terminal pads (19d', 20d') to respective connecting pads (19c', 20c') which are aligned with joinder pads (19b', 20b') formed on the base. The base has a recessed portion (24b') in its outer wall providing access to terminal pads (18b', 19d', 20d').

9 Claims, 3 Drawing Sheets

PRESSURE TRANSDUCER APPARATUS AND METHOD FOR MAKING SAME

BACKGROUND OF THE INVENTION

This invention relates generally to pressure sensors and more particularly to pressure responsive variable parallel plate capacitive transducers. Such transducers are shown and described, for example, in U.S. Pat. No. 4,716,492, assigned to the assignee of the present invention. A capacitive transducer is shown in the patent having a thin ceramic diaphragm mounted in closely spaced, sealed, overlying relation on a ceramic base, with metal coatings deposited on respective opposing surfaces of the diaphragm and the base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied fluid pressure. The diaphragm is movable in response to variations in pressure applied to the diaphragm to vary the capacitance of the capacitor and the electrical circuit provides an electrical output signal corresponding to the applied pressure.

In order to maximize the economies of mass production to lower the transducer cost and thereby make such transducers economically feasible for a wide number of applications, including many previously served by low cost mechanical transducers, a standard size package is selected small enough to be received in a large number of applications yet large enough to provide a reliable signal. The size of the package determines the maximum size of the capacitor plates which, along with the gap between the plates, determines the capacitance signal. This results in limiting the size of the capacitor plates to a smaller size than would be ideal for many applications and relying on the electrical circuit to properly condition the signal. The circuit, on the other hand, requires a minimum level of capacitance for it to be able to effectively condition the output signal and this in turn affects the distance or gap required between the capacitor plates to produce the minimum capacitance level. In transducers of the type disclosed in U.S. Pat. No. 4,716,492 distances between the plates are in the order of 10-17 microns.

One approach described in the above patent to provide this selected gap employs a flat diaphragm element secured to the base substrate in selectively spaced relation thereto by disposing a spacing and securing medium such as a mixture of glass frit including a plurality of balls of glass of selected diameter between the flat diaphragm and the substrate at the periphery of the diaphragm. The glass frit is selected to be fusible at a first temperature at which the balls remain unfused and the mixture is then heated to the fusing temperature of the frit to secure the diaphragm to the substrate at a spacing from the substrate determined by the diameter of the balls. The provision of flat surfaces which extend over the entire diaphragm as well as the base substrate is very conducive to consistent, reproducible results from device to device; however, the flat surfaces generally require grinding to ensure that the surfaces are parallel to one another. Further, the use of the glass material to both space and secure the diaphragm to the base results in undesirable yield losses due to various factors such as unevenness sometimes occurring due to imperfections in the grinding process, variations in the compressive force used to clamp the diaphragms to the base when the device is fired to fuse the glass and other process variables such as the specific temperature profile of the firing and the specific glass composition employed.

In copending U.S. application Ser. No. 07/972,680, assigned to the assignee of the present invention, an improved, low cost pressure transducer is shown and described which comprises a body of ceramic material having a cavity formed therein closely adjacent an outer surface thereof. Metal capacitor plates are deposited on opposite sides of two surfaces defining the cavity with vias extending to terminal areas. The ceramic comprises conventional material such as 80% by weight alumina up to essentially 100% with the balance being additives to form a glass at a sintering temperature. The ceramic is provided in powdered form coated with an organic binder ready for pressing into any selected configuration. First and second portions, i.e., a diaphragm and a base having a recess formed in an outer face surface, are formed by pressing the powder in respective dies. Metallized coatings are deposited, as by screen printing, on one surface of the diaphragm portion and on the recessed outer face surface of the base portion. The vehicle used in the coatings is then removed, preferably by heating. Spacer means of organic material is optionally placed in the recess to ensure that the cavity gap is maintained during the following pressing step. The two portions are then pressed together to form a single unit and then the unit is heated in an air atmosphere to a first debinderizing temperature. After the organics, including the spacer means, are vaporized/decomposed and released through the still open cells of the ceramic, the unit is placed in a high temperature oven and co-fired in a reducing atmosphere with the metal layers forming a conductive coating bonded to the ceramic and the ceramic being sintered together to form a monolithic, closed cell body.

The metallized coatings on the base and diaphragm portions include a central plate portion in addition to traces or vias extending from the plate portion in a radial direction out toward the outer periphery of the body to a pad for connection to external terminal members.

These pads, however, are located within the monolithic body so that electrical connection to them must be effected by connecting an outside lead or terminal to the pad. This can be accomplished by forming a cut-out portion in a portion of the diaphragm portion extending to the pad. However, while the plate portion on the base can be connected to a terminal pad formed on the base at the cut-out portion it is difficult to provide a suitable electrical trace connecting the plate portion on the diaphragm with a corresponding terminal pad formed on the base. Further, it becomes cumbersome to attempt to make external electrical connections at this location and still provide a suitable package for the sensor which exposes the sensing surface to a fluid pressure source whose pressure is to be monitored.

Another way of providing electrical access is to form bores through the base portion aligned with the pads. After the body has been sintered, terminal pins are inserted in the bores along with suitable conductive epoxy to form a continuous electrically conductive path from the pin, through the conductive epoxy to respective pads. When the pad is disposed on the diaphragm portion the conductive epoxy is in direct contact with the major surface area of the pad thereby forming an efficient electrical connection; however, when the pad is disposed on the base portion it becomes more difficult to make a consistent, reliable electrical connection. Although it is possible to plate around sharp corners such as the corner formed by a bore and a surface around the bore, it would require chemical baths and a relatively large capital investment making the resulting device too costly. Screen printing is economical and suitable for applying the circuit traces and pads. However, attempting to print around a 90° corner can result in reliability problems. That is, getting the pad to extend into the bore requires using a vacuum to pull the conductive material (ink) into the bore. The flow rate into the bore requires close control to ensure that the ink is not sucked off the corner by the passing gasses which would result in a discontinuous connection in the bore. A shallow ramp leading to the bore could be provided with the conductive layer printed on the ramp and the conductive epoxy received in the cut-out portion forming the ramp as shown in U.S. Pat. No. 4,972,717. However, use of a ramp involves more space than is desirable when making a small transducer. Further, when pressing the diaphragm and base together to a form a monolithic body it is difficult to obtain consistent geometrical spacing from device to device.

SUMMARY OF THE INVENTION

It is therefore an object of the invention to provide a pressure transducer having improved electrical connection structure and a method for making such a transducer.

Briefly, in accordance with the invention, a pressure responsive transducer comprises a body of ceramic material having a cavity formed therein closely adjacent an outer surface thereof. The ceramic comprises conventional material such as 80% by weight alumina up to essentially 100% with the balance being additives to form a glass at a sintering temperature. The ceramic is provided in powdered form coated with an organic binder, such as a spray dried powder, ready for pressing into any selected configuration. First and second portions, i.e., a diaphragm and a base having a recess formed in a top face surface of the base, the sidewall of the recess being inclined in order to facilitate printing of a conductive trace thereon, are formed by pressing the powder in respective dies. The base portion is formed with a plurality of bores extending between top and bottom face surfaces, spaced from the recess. After pressing, a pattern of metallized coatings are deposited, as by screen printing, on one face surface of the diaphragm portion and on the top face surface of the base portion. The pattern on the base portion includes a centralized plate portion on the bottom wall of the recess with a trace or via extending therefrom up the inclined sidewall of the recess to an annular joinder pad formed around a first bore. Preferably, a guard ring is also deposited on the top face of the base portion having a trace extending to an annular joinder pad formed around a second bore. The pattern on the diaphragm portion includes a centralized plate portion with a trace extending out to a terminal pad located so as to be in alignment with a third bore when the diaphragm portion is placed on the base portion. Additional terminal pads having an outer periphery generally matching those of the annular joinder pads on the base portion are deposited on the diaphragm portion located so as to be in alignment with the respective first and second bores when the diaphragm portion is placed on the base portion. Suitable means, such as indexing notches, are formed on the base and diaphragm portions to ensure proper orientation of the portions relative to one another. The diaphragm portion is then placed on the base portion preferably with a fugitive spacer received in the recess, and sintered to form a monolithic body. Terminal pins are placed in the respective bores along with electrically conductive epoxy to form continuous electrical paths from first and second terminal pins through the conductive epoxy to respective terminal pads to respective annular joinder pads and then to the respective plate and guard ring. A conventional electrical path is formed between the plate on the diaphragm portion through its terminal pad directly to the conductive epoxy and its respective terminal pin. According to a modified embodiment the base portion is formed with a cut away or recessed portion extending from the bottom face to the diaphragm portion forming an exposed shelf and connection pads are formed on the diaphragm inboard of the shelf in alignment with joinder pads of the plate and guard ring on the base. Vias extend from the connection pads on the diaphragm radially outward onto the shelf to respective terminal pads which are accessible to externally attached terminal leads as by soldering thereto.

BRIEF DESCRIPTION OF THE DRAWINGS

Other objects, advantages and details of the novel and improved capacitive pressure transducer of the invention and method of making appear in the following detailed description of preferred embodiments of the invention, the detail description referring to the drawings in which.

Figure 4:
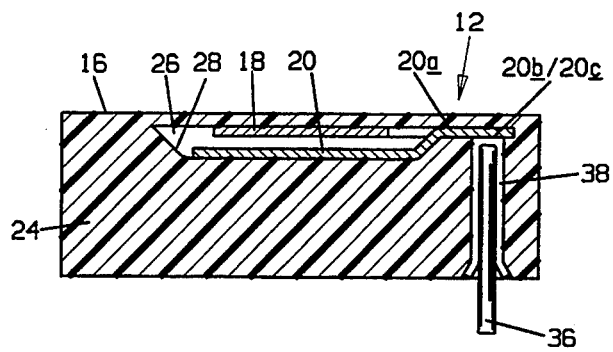
FIG. 4 is a cross section taken on line 4—4 of FIG. 2 after the unit has been sintered showing a terminal pin electrically connected to the capacitor plate of the base portion.

With particular reference to FIG. 4 of the drawings, a pressure responsive, variable capacitive transducer 12 made in accordance with the invention comprises a monolithic body of ceramic material having a cavity 14 formed therein closely adjacent an outer surface 16 of the body. Capacitor plates 18, 20 formed of suitable material such as metal, as will be described below, are disposed on opposed surfaces of the cavity with vias extending from the plate to respective terminal pads for connection to externally disposed signal conditioning electrical circuitry (not shown).

Although various ceramic materials can be utilized such as cordierite, mullite, etc., according to a first embodiment of the invention, a suitable composition comprises between approximately 80% by weight up to essentially 100% alumina with the balance being additives which form a glass at the sintering temperature of the alumina. Such material is conventional in the electronic substrate industry and can be either purchased as a spray dried powder ready to press or can be specifically formulated and spray dried according to known techniques to produce a free-flowing, granulated powder ready for pressing (numeral 1 in FIG. 5). The spray dried powder contains the alumina and an organic binder such as polyvinyl alcohol or other plastic to serve as a temporary adhesive holding the powder together after pressing until the resultant pressed material is sintered.

Figure 1:
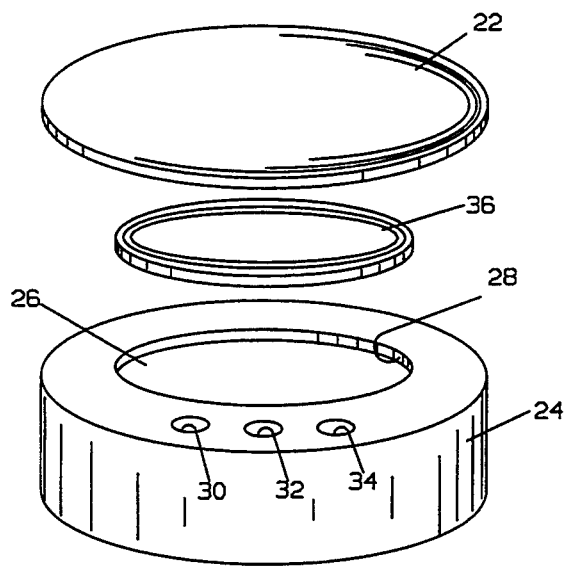
FIG. 1 is a blown apart perspective view of a diaphragm, a base and a spacer means prior to being formed in a unitary body.

The alumina spray dried powder is pressed (numeral 2 of FIG. 5) into the shapes of a generally cylindrical diaphragm and a base as shown in FIG. 1 at 22, 24 respectively, using a pressure in the range of approximately 1,000–30,000 psi. As seen in the figure a recess or depression 26 of a selected depth of between 0.001 to 0.010 inches is formed in one end face of base 24 at the time it is pressed although, if desired, the recess could be formed wholly or partially in the diaphragm as well. The depth of the recess is selected to allow for shrinkage of the materials, including the capacitor plates, to provide spacing between the electrodes from approximately 0.5 to 2.5 mils in the finished transducer. Recess 26 is preferably formed with an inclined sidewall 28 forming an angle with the bottom wall of the recess and the top surface of base 24 suitable for depositing a continuous layer of metal, as by screen printing. An angle of approximately 150° with the bottom wall and the top surface has been found to be satisfactory. Also formed in base 24 are bores 30, 32, 34 extending between opposite face surfaces of the base.

Figure 2:
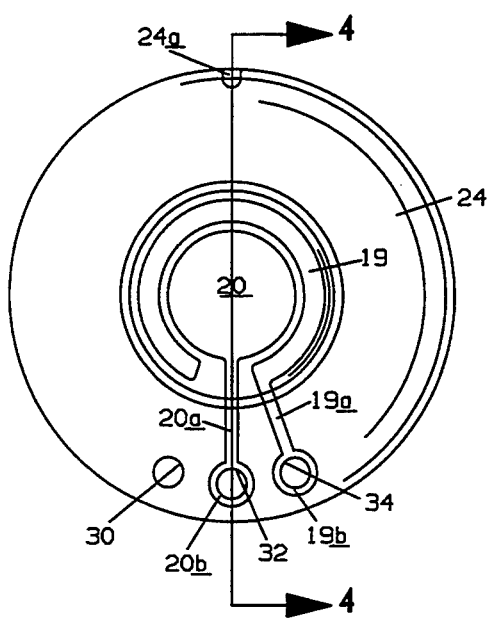
FIG. 2 is a top plan view of the base with a metallized layer deposited thereon.
Figure 3:
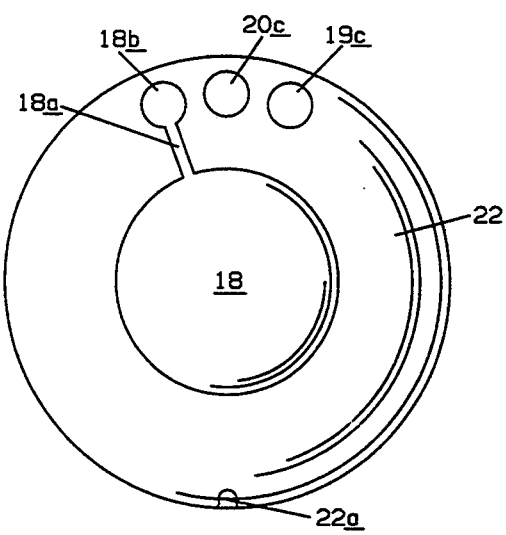
FIG. 3 is a bottom plan view of the diaphragm with a metallized layer deposited thereon.

After the initial pressing, the diaphragm 22 and base 24 are strong enough to permit handling. A selected electrode pattern is applied (numeral 3 of FIG. 5) to the bottom surface of the diaphragm 22 and top surface of base 24 (FIGS. 3, 2 respectively) by any suitable means, such as screen printing. The electrode pattern, as seen in FIGS. 2 and 3, include a top or movable plate 18 with a via 18a extending radially outwardly to a terminal pad 18b disposed adjacent to but inboard of the outer periphery of diaphragm 22 and arranged to be in alignment with bore 30 of base 24 when diaphragm 22 is placed onto base 24 for attachment thereto with the plane of the lower surface of diaphragm 22 coinciding with the plane of the upper surface of base 24. Base 24 has a bottom or stationary plate 20 disposed centrally within recess 26 with a via 20a extending radially outwardly, up inclined sidewall 28 out to a joinder pad 20b formed as an annulus around bore 32. A terminal pad 20c having an outer periphery generally matching that of the outer periphery of joinder pad 20b is deposited on diaphragm 22 at a location selected to be in alignment with joinder pad 20b when diaphragm 22 is placed onto and joined to base 24. Preferably, terminal pad 20c covers a surface area which matches or overlaps the outer periphery of joinder pad 20b.

A guard ring 19 is preferably deposited on base 24 around plate 20 in a conventional arrangement and has a via 19a extending radially therefrom up inclined sidewall 28 out to a joinder pad 19b formed as an annulus around bore 34. A terminal pad 19c having an outer periphery generally matching that of the outer periphery of joinder pad 19b is deposited on diaphragm 22 at a location selected to be in alignment with joinder pad 19b when diaphragm 22 is placed onto base 24. As in the case of terminal pad 20c referenced above, it is preferred that terminal pad 19c covers a surface area which matches or overlaps the outer periphery of joinder pad 19b. Suitable orientation means are provided to ensure proper alignment of the base and diaphragm such as indexing notches 22a and 24a in diaphragm 22 and base 24, respectively.

Any suitable high temperature metal can be used for the metal layers such as tungsten, molybdenum/manganese, platinum or other high temperature material such as a conductive ceramic. For screen printing the metallization is applied in the form of conventional thick film paste which typically contains certain solvents to adjust viscosity for screen printing. After application the solvents can be removed slowly at room temperature or more rapidly by placing the parts into an air oven at approximately 100° C. (numeral 4 of FIG. 5).

Although it is possible to press the diaphragm and base together without any spacing means placed therebetween and still maintain a gap between the diaphragm and the bottom of the recessed area, particularly with relatively large gaps, it is preferred to use a fugitive spacer, particularly with relatively smaller gaps. That is, a spacer helps to maintain uniform separation between the two electrodes and prevent the two electrodes from engaging one another during the next step of pressing the diaphragm to the base. A fugitive spacer element 36 composed of essentially non-compressible, consumable or decomposable material and having a thickness preferably essentially equal to the desired spacing between the electrodes, or a plurality of sheets of such material the total thickness of which preferably essentially equals the desired spacing, is placed in recess 26 (numeral 5 of FIG. 5). The spacer material is selected so that it is clean burning, i.e., so that there is no ash remaining when the spacer has been thermally removed after pressing the base and diaphragm together. Propylene carbonate and Delrin, a trademark of E.I. du Pont de Nemours Company for acetal, thermoplastic resin, are two such materials, and can be used in various thicknesses depending upon the desired gap. In transducers made in accordance with the invention spacers from 0.001 to 0.006 inches thick have been used. That is, multiple spacers can be employed to accommodate any selected gap dimension.

Figure 5:
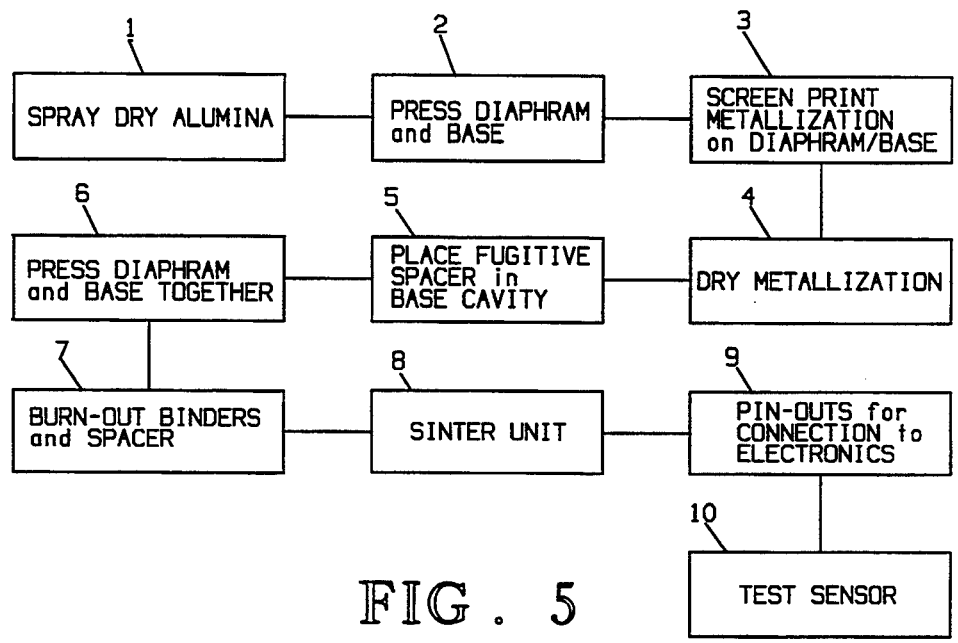
FIG. 5 is a flow chart showing the process steps for fabricating a monolithic sensor in accordance with the invention.
Figure 6:
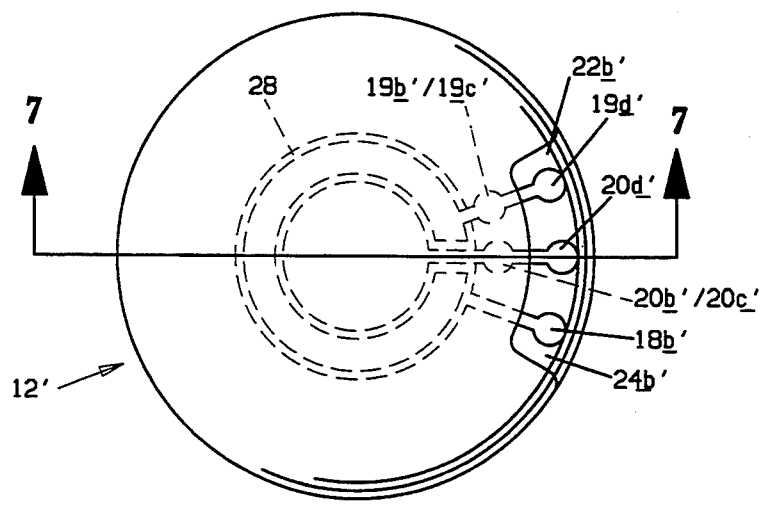
FIG. 6 is a bottom plan view of a sensor made in accordance with a modified embodiment of the invention.
Figure 7:
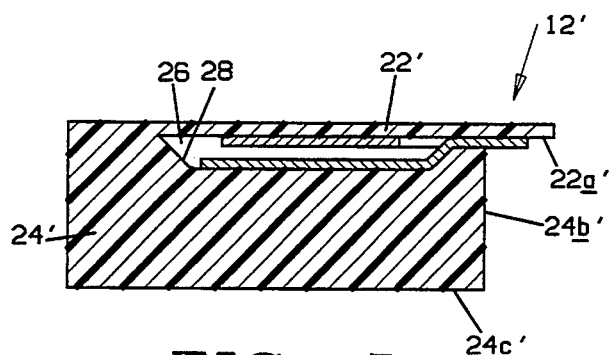
FIG. 7 is a cross section, similar to FIG. 4, of a transducer made in accordance with the modified embodiment.
Figure 8:
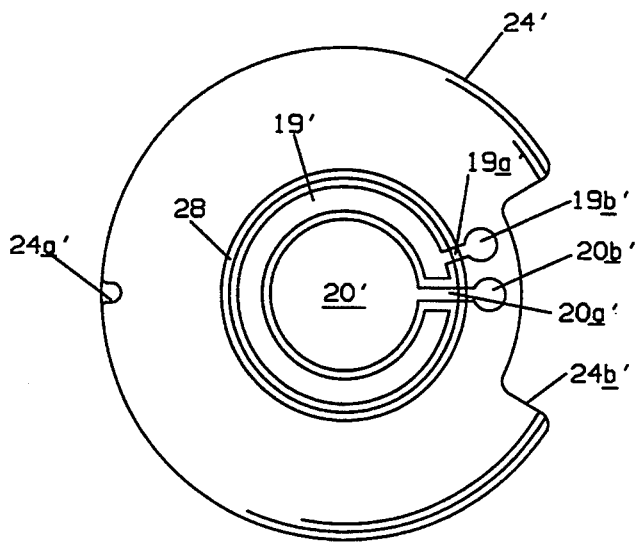
FIGS. 8 and 9 are top and bottom plan views of the FIG. 7 base and diaphragm portions respectively prior to being joined together.

As seen at 6 in FIG. 5, diaphragm 22 and base 24 are then placed into a die or suitable isostatic press and pressed together using a pressure in a range between approximately 1,000 and 30,000 psi.

The diaphragm and base, now pressed together to form a single body or unit is placed in an oven and heated in an air atmosphere at relatively low temperatures, e.g., 300° C. in order to evaporate and burn out the binders and spacer material and allow the evaporated matter and combustion gasses to pass through the pores of the body before the body is sintered and the pores closed (numeral 7 of FIG. 5). The temperature is limited by the maximum temperature at which the metallization can be heated in an air or oxygen atmosphere without significant oxidation.

After removing as much as possible of the organic binder and the spacer material during the debinderizing operation, the assembled unit is placed into a high temperature furnace and sintered in the range of approximately 1400°–1700° C. in a reducing atmosphere (numeral 8 of FIG. 5). Typically, the atmosphere contains approximately 1–100% hydrogen with the balance usually nitrogen or cracked ammonia. Sintering the alumina converts the unit into a monolithic device as shown at 12 in FIG. 4 and effects the bonding of the metallization layer to the alumina and with the aligned portions of the terminal pads and joinder pads coalescing to form a conductive layer.

Terminal pins and conductive epoxy are then placed in bores 30, 32, 34 with a continuous electrical path being formed from respective pins to the capacitive plates and the guard ring. With respect to capacitor plate 20 and guard ring 19, the paths extend from a respective pin through conductive epoxy to a respective terminal pad 20c, 19c, then to a respective joinder pad 20b, 19b which have coalesced together through the overlapping layers, and then through vias 20a, 19a to the respective capacitor plate and guard ring. Capacitor plate 18, on the other hand, has its terminal pad 18b connected directly to a terminal pin through conductive epoxy.

Figure 9:
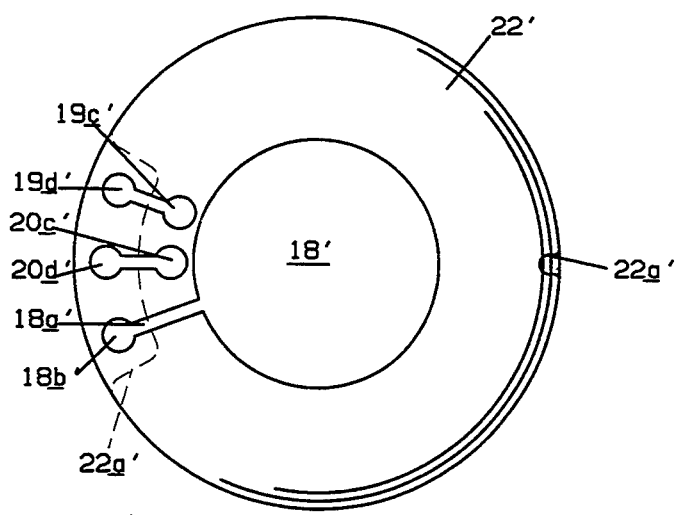

A modified embodiment is shown in FIGS. 6 through 9 in which body 24' of transducer 12' is formed with a recessed or cut-out portion 24b' at its outer periphery extending from the bottom outer face 24c' all the way to diaphragm portion 22' to form a terminal flange 22a'. As best seen in FIG. 9, movable plate 18' is centrally disposed on diaphragm 22' and has a via 18a' extending radially out to a terminal pad 18b' adjacent to the outer periphery of the diaphragm on terminal flange portion 22a' indicated by the dashed line. Also formed on terminal flange portion 22a' are terminal pads 19d' and 20d' which lead respectively to connector pads 19c' and 20c' spaced radially inwardly of terminal flange portion 22a'. Base 24' is formed with stationary plate 20' within recess 26 in the same manner as in the FIGS. 2–4 embodiment and has a via 20a' extending out to joinder pad 20b'. Guard ring 19', deposited on base 24' around plate 20' has a via 19a' extending out to joinder pad 19b'. Joinder Pads 19b', 20b' are located relative to connector pads 19c' and 20c' respectively so that when diaphragm 22' is placed on base 24' using suitable orienting means such as indexing notches 22a', 24a' shown, pads 19c'/19b' and 20c'/20b' will coalesce during the sintering step thereby forming respective unitary conductive layers with a continuous electrical path extending from terminal pad 18b' to top plate 18', terminal pad 20d' through connector pad 20c' and joinder pad 20b' to stationary plate 20' and terminal pad 19d' through connector pad 19c' and joinder pad 19b' to guard ring 19'.

The specific materials for the metallization and the ceramic are chosen so that the shrinkage rates are sufficiently close to one another to prevent warpage. Further, the thermal contraction of the materials should be sufficiently similar and the temperature profile employed during cooling from the firing temperature such that cracking does not occur.

The cavity or gap 26 in device 12 has an atmosphere determined by the sintering atmosphere of the furnace. For vacuum devices the furnace atmosphere could be evacuated prior to reaching the sintering temperature or a suitable hole could be pressed into the base when originally formed. The device could be evacuated after sintering and the hole sealed with suitable sealant material.

After the electrical connection means are added as by attaching pins to the metallized pads with conductive epoxy (numeral 9 of FIG. 5) the unit may be tested as indicated at 10 of FIG. 5.

Although conductive epoxy has been disclosed for effecting electrical connection from the metallized pads to terminal pins, it is within the purview of the invention to employ other suitable means such as solder or spring elements.

It will be appreciated that with appropriate binders in the spray dried powder and with an appropriate polymer for the spacing means if one is desired, the debinderization step could be effected as part of the firing cycle.

It is within the purview of the invention to employ low temperature ceramics such as alumina, silica or other conventional materials and a glass binder used in making electronic substrates, which can be sintered at temperatures such as approximately 700°–1000° C. in air along with standard thick film inks for metallization, such as silver palladium, gold, copper and the like. The glass composition is chosen so that densification is complete at that temperature. A significant advantage of using low temperature ceramics is that it avoids having to use a controlled atmosphere during the co-firing process.

It is also within the purview of the invention to print the metallization layers on opposite sides of a spacer element or on one side of separate elements if more than one spacer element is used. The metallized layers will be transferred to the respective surfaces of the diaphragm and base during the pressing operation.

Although transducers made in accordance with the invention described above comprise monolithic bodies of ceramic having closed cells it will be appreciated that the invention can be practiced with bodies which are not monolithic, i.e., transducers in which the diaphragms are joined to the bases with some type of adhesive material or the like and further, the transducers could be formed of material having open cells, if, for example, a more flexible diaphragm portion is desired.

It should be understood that though preferred embodiments of the invention have been described by way of illustrating the invention, this invention includes all modifications and equivalents of the disclosed embodiments falling within the scope of the appended claims.

We claim:

1. A capacitive pressure transducer comprising a body of ceramic material having an outer periphery and having a top and bottom surface and having a closed cavity in the body adjacent to the top surface, the cavity having a top wall, a flat bottom wall and a sidewall which is inclined at an angle radially outwardly, respective electrically conductive layers disposed on the top wall and the flat bottom wall separated from one another by a gap, an electrically conductive via extending radially outwardly from the layer on the top wall to a first terminal pad adjacent to and inboard of the outer periphery and being disposed on a plane, an electrically conductive via extending radially outwardly from the layer on the flat bottom wall up the inclined sidewall radially outwardly to a first joinder pad adjacent to and inboard of the outer periphery and spaced from the first terminal pad and disposed essentially on the plane, a second terminal pad disposed on the plane and aligned with the first joinder pad, first and second bores formed through the body from the bottom surface up to the plane and being in alignment with the first and second terminal pads respectively, the second bore extending through the first joinder pad but not through the second terminal pad, a terminal pin disposed in each bore and means to electrically connect the terminal pins to the respective first and second terminal pads.

2. A capacitive pressure transducer according to claim 1 in which the sidewall forms an angle with the bottom wall of approximately 150°.

3. A capacitive pressure transducer according to claim 1 further including a guard ring disposed on the bottom wall and an electrically conductive via extends radially outwardly from the guard ring up the sidewall to a second joinder pad adjacent to and inboard of the outer periphery and spaced from the first and second terminal pads and the first joinder pad and disposed essentially on the plane, a third terminal pad disposed on the plane and aligned with the joinder pad, a third bore formed through the body from the bottom surface up to the plane and being in alignment with the second joinder pad, the third bore extending through the second joinder pad but not through the third terminal pad, a terminal pin disposed in the third bore and means to electrically connect the terminal pin in the third bore to the third terminal pad.

4. A capacitive pressure transducer according to claim 1 in which the first joinder pad has an outer periphery and the second terminal pad extends to and is aligned with the outer periphery of the first joinder pad.

5. A capacitive pressure transducer according to claim 3 in which the second joinder pad has an outer periphery and the third terminal pad extends to and is aligned with the outer periphery of the second joinder pad.

6. A capacitive pressure transducer according to claim 1 in which the means to electrically connect the terminal pins disposed in the first and second bores to the respective first and second terminal pads comprises electrically conductive epoxy.

7. A capacitive pressure transducer according to claim 3 in which the means to electrically connect the terminal pins disposed in the third bore to the third terminal pad comprises electrically conductive epoxy.

8. A capacitive pressure transducer comprising a monolithic body of ceramic material having an outer periphery and having a top surface and a bottom surface and having a closed cavity in the body adjacent the top surface, the cavity having a top wall, a flat bottom wall and a radially outwardly inclined sidewall connecting the top and bottom walls, a first layer of electrically conductive material disposed on the top wall having a via extending out to a first terminal pad within the body and adjacent the outer periphery, a bore extending from the bottom surface of the body to the first terminal pad, a second layer of electrically conductive material disposed on the flat bottom wall having a via extending up the radially outwardly inclined sidewall to a first joinder pad within the body and adjacent the outer periphery spaced from the first terminal pad, a second terminal pad of electrically conductive material aligned with the first joinder pad and in electrical engagement with the first joinder pad, a bore extending from the bottom surface of the body through the first joinder pad to the second terminal pad, an electrically conductive pin received in each bore and means to electrically connect the pins and the respective first and second terminal pads to form electrical paths between an electrically conductive pin and the first layer and another electrically conductive pin and the second layer.

9. A capacitive pressure transducer according to claim 8 in which the means to electrically connect the terminal pins and the first and second terminal pads comprises electrically conductive epoxy.

* * * * *